United States Patent
Kreet et al.

(10) Patent No.: US 11,082,555 B2
(45) Date of Patent: Aug. 3, 2021

(54) METHOD FOR ASSOCIATING A PBX EXTENSION WITH A USER ACCOUNT OF A CLOUD SERVICE APPLICATION

(71) Applicant: ALE INTERNATIONAL, Colombes (FR)

(72) Inventors: Olivier Kreet, Strasbourg (FR); Moussa Zaghdoud, Strasbourg (FR); Cyril Mazard, Oberhaslach (FR)

(73) Assignee: ALE INTERNATIONAL, Colombes (FR)

( * ) Notice: Subject to any disclaimer, the term of this patent is extended or adjusted under 35 U.S.C. 154(b) by 32 days.

(21) Appl. No.: 16/495,519

(22) PCT Filed: Mar. 26, 2018

(86) PCT No.: PCT/IB2018/052039
§ 371 (c)(1),
(2) Date: Sep. 19, 2019

(87) PCT Pub. No.: WO2018/178843
PCT Pub. Date: Oct. 4, 2018

(65) Prior Publication Data
US 2020/0021684 A1 Jan. 16, 2020

(30) Foreign Application Priority Data
Mar. 27, 2017 (EP) .................................... 17305348

(51) Int. Cl.
*H04W 72/04* (2009.01)
*H04M 3/42* (2006.01)
*H04M 3/56* (2006.01)

(52) U.S. Cl.
CPC ..... *H04M 3/42323* (2013.01); *H04M 3/4234* (2013.01); *H04M 3/563* (2013.01)

(58) Field of Classification Search
CPC ........... H04M 3/42323; H04M 3/4234; H04M 3/563; H04M 3/493; H04M 3/42263
See application file for complete search history.

(56) References Cited

U.S. PATENT DOCUMENTS 9,332,119 B1 5/2016 Danis
2009/0180467 A1* 7/2009 Storey ................. H04M 3/4234
370/352

(Continued)

FOREIGN PATENT DOCUMENTS

CN 1486074 A 3/2004
CN 101079931 A 11/2007
(Continued)

OTHER PUBLICATIONS

European Search Report with regard to the counterpart European Patent Application No. 18776698.5 dated Feb. 6, 2020.
(Continued)

*Primary Examiner* — Hassan Kizou
*Assistant Examiner* — Mahbubul Bar Chowdhury
(74) *Attorney, Agent, or Firm* — BCF LLP

(57) ABSTRACT

A method for associating a PBX extension (21) with a user account (31), the method comprising: (S1) receiving an association request comprising a PBX extension telephone number from a user account (31), (S2) sending an association code to the user account (31), (S6) sending to the PBX central unit (22), a command to connect the PBX extension (21) to the IVR application (33), (S8) receiving through the IVR application (33), an association code from the PBX extension (21), (S10) if the association code received from the PBX extension (21) is the same as the association code sent to the user account (31) enabling the control of the PBX extension (21) from the user account (31) through the CTI link (51).

16 Claims, 2 Drawing Sheets

(56) References Cited

U.S. PATENT DOCUMENTS

| | | | |
|---|---|---|---|
| 2009/0296907 | A1 | 12/2009 | Vendrow et al. |
| 2010/0061533 | A1 | 3/2010 | Rice |
| 2010/0091762 | A1 | 4/2010 | Roberts et al. |
| 2010/0150337 | A1 | 6/2010 | Chen et al. |
| 2011/0110511 | A1* | 5/2011 | Vendrow ............. H04M 3/4234 379/201.04 |
| 2011/0177797 | A1* | 7/2011 | Vendrow ............... H04M 1/006 455/414.1 |
| 2011/0280151 | A1 | 11/2011 | Medynski et al. |
| 2012/0047266 | A1* | 2/2012 | Minert .................. H04M 11/06 709/226 |
| 2014/0342711 | A1 | 11/2014 | Vendrow et al. |
| 2014/0378117 | A1 | 12/2014 | Vendrow et al. |
| 2016/0191507 | A1 | 6/2016 | Bao et al. |

FOREIGN PATENT DOCUMENTS

| | | | |
|---|---|---|---|
| CN | 101406031 | A | 4/2009 |
| CN | 103905597 | A | 7/2014 |
| CN | 105611089 | A | 5/2016 |
| EP | 0757877 | A1 | 2/1997 |
| WO | 9627266 | A1 | 9/1996 |

OTHER PUBLICATIONS

International Search Report and Written Opinion with regard to PCT/IB2018/052039 dated Jul. 10, 2018.
Office Action with regard to the Chinese Patent Application No. 201880028024.4 dated Oct. 23, 2020, and English Translation.
English Abstract for CN1486074 retrieved from Espacenet on Nov. 24, 2020.
English Abstract for CN101079931 retrieved from Espacenet on Nov. 24, 2020.
English Abstract for CN101406031 retrieved from Espacenet on Nov. 24, 2020.
European Communication pursuant to Article 94(3) EPC with regard to the European Patent Application No. 18776698.5 dated Oct. 7, 2020.
Notification of Grant and Search Report with regard to the Chinese Patent Application No. 201880028024.4 dated Dec. 22, 2020, and English Translation.
English Abstract for CN103905597 retrieved from Espacenet on Jan. 8, 2021.
English Abstract for CN105611089 retrieved from Espacenet on Jan. 8, 2021.

* cited by examiner

METHOD FOR ASSOCIATING A PBX EXTENSION WITH A USER ACCOUNT OF A CLOUD SERVICE APPLICATION

CROSS-REFERENCE TO RELATED APPLICATIONS

The present application claims priority to European Patent Application No. 17305348.9, filed Mar. 27, 2017, entitled "Method for associating a PBX extension with a user account of a cloud service application", which is incorporated by reference herein in its entirety.

FIELD OF THE INVENTION

The invention relates to cloud service applications for controlling PBX extensions. A PBX (Private Branch Exchange) is a system that connects telephone extensions to the Public Switched Telephone Network and provides internal communication.

BACKGROUND

In the context of an hybrid cloud solution coupling communication devices of a PBX system (also called PBX phones or extensions) deployed on customer premises, and a cloud services enabling PBX users to drive their phone through CTI from rich cloud applications, there is a need for an easy to use and secured way to associate users of this cloud service with their PBX extension where this service will be enabled.

The prior art provides for a first set of admin-driven solutions. These solutions require involvement of the company administrator, making the solution costly to manage One of these solutions consists in leaving the company administrator configure, or validate, all associations of end-users with their corresponding extensions. In this case the end-user is not involved (or only partially through requesting the service activation to the administrator) in the association. It requires significant involvement of this administrator, with recurrent actions as news users enroll in the solution. It also delays availability of the service for end-users, as they have to wait the corporate admin action to benefit the cloud service. This process might impair adoption of the service in light of the efforts required for its activation. Even if the device is configured with a first name and a last name on PBX side, so that the cloud service can make a pre-association using the name configured in the PBX and the name configured in the cloud service, the association must still be confirmed by the administrator as it may lead in error cases and wrong automatic association if the configured names are not exactly the same.

For example, the prior art provides for association methods requiring user definition in the PBX to be filled with a mail address that has to match the cloud account of the user. This procedure requires a deep involvement of the administrator as this email address might not pre-exist in the PBX (and of course takes as hypothesis that the PBX data model includes user email address, further increasing the conditions for the solution to be applicable).

Other solutions are user-driven, as the one proposed in this invention. For example, some social network applications allow easily enrolling a mobile device and possibly associate a web account, but such procedures rely on advanced capabilities available on such mobile devices (Internet connectivity, camera, necessarily reachable Direct inward dialing (DID)). Such solutions are not applicable with simple PBX devices, and moreover do not necessarily provide a sufficient level of assurance on the identities being published (ie the user name might not be fully trustworthy)

SUMMARY

The invention provides for a method for associating a PBX extension with a user account of a cloud service application for controlling PBX extensions, the cloud service application for controlling PBX extensions being provided by a cloud infrastructure, the cloud infrastructure comprising at least a cloud service server, the PBX extension belonging to a PBX system, the PBX system further comprising a PBX central unit connecting PBX extensions to a Public Switched Telephone Network, the PBX central unit and the cloud service server being connected through a computer telephony integration—CTI—link over an Internet Protocol network, the cloud infrastructure further providing an interactive voice response—IVR—application available to the PBX extensions over the PSTN network, the method comprising: receiving, at the cloud service server, an association request from a user account, the association request comprising a PBX extension telephone number, sending, from the cloud service server, an association code to the user account, sending, from the cloud service server to the PBX central unit, a command to monitor the PBX extension associated to the PBX extension telephone number, sending, from the cloud service server to the PBX central unit, a command to connect the PBX extension associated to the PBX extension telephone number to the IVR application, the command including a public extension telephone number leading to the IVR application, receiving, at the cloud service server through the IVR application, an association code from the PBX extension, comparing, at the cloud service server, the association code received through the IVR application with the association code sent to the user account, if the association code received from the PBX extension is the same as the association code sent to the user account, associating, at the cloud service server, the PBX extension to the user account, thereby enabling the control of the PBX extension from the user account through the CTI link.

In embodiments, the method further involves detecting, through the IVR application, a direct inward dialing number of the calling PBX extension and associating, at the cloud service server, the detected direct inward dialing number of the PBX extension with the user account.

The transmission of an activation code to the cloud service user account (the end user) ensures the right person receives the information. The verification of this code through the CTI connection piloting the associated PBX extension ensures the operation is done on the right PBX extension and by the right person.

The user-device association method provided by the invention is easy to perform and involves little human interaction, so the operational costs are reduced to the minimum. The method provides guarantees that the association is done on the right phone, avoiding configuration mistakes and identity usurpation (fraudulent use of the device), and giving the cloud service provider ways to track and prevent fraudulent actions.

The invention empowers end-users into performing this association themselves through an easily applicable method, while providing assurance to the cloud service provider, and to the corporate administrator, that the operation cannot lead to undetectable invalid associations.

The user-device association method according to the invention requires no company neither cloud administrator action, incurring no operational cost per user for this association action. User enrolment therefore easily scales, and such solution shall therefore foster the cloud service adoption by administrators.

This user-device association method according to the invention does not disclose company sensitive information such as PBX/Phone passwords to the cloud service.

This user-device association method according to the invention is applicable on all PBXs that provide a CTI link.

In embodiments, sending, from the cloud service server to the PBX central unit, a command to monitor the PBX extension associated to the PBX extension telephone number, is performed upon receiving an association finalization request from the user account.

In embodiments, the method further comprises sending, to the PBX central unit over the CTI link, a command to lock the PBX extension associated to the PBX extension telephone number, wherein a local PBX extension code is to be dialed at the PBX extension to unlock it, the local PBX extension code being different from the association code.

In embodiments, the method further comprises generating, at the cloud service server, an association context identifier associated to the association code and storing the association code together with the association context identifier, wherein the command to connect the PBX extension associated to the PBX extension telephone number to the IVR application further includes the association context identifier, and wherein the method further comprises, receiving, at the cloud service server through the IVR application, the association context identifier from the PBX central unit, and wherein comparing the association code received from the PBX extension with the association code sent to the user account, includes retrieving the association code sent to the user account based on the association context identifier received through the IVR application.

In embodiments, the method further comprises detecting, through the IVR application, a direct inward dialing number of the calling PBX extension and associating, at the cloud service server, the detected direct inward dialing number of the PBX extension with the user account.

In embodiments, the association code received through the IVR application is encoded within a Dual-tone multi-frequency signaling—DTMF—signal.

The invention also provides a cloud architecture providing a cloud service application for controlling PBX extensions belonging to a PBX system, the PBX system further comprising a PBX central unit connecting PBX extensions to a Public Switched Telephone Network, the cloud infrastructure comprising at least a cloud service server, the cloud infrastructure providing an IVR application available to PBX extensions over the PSTN network, the cloud service server comprising: a CTI link for communicating with the PBX central unit over an Internet Protocol network, control means arranged for receiving, at the cloud service server, an association request from a user account, the association request comprising a PBX extension telephone number, sending, from the cloud service server, an association code to the user account, sending, from the cloud service server to the PBX central unit, a command to monitor the PBX extension associated to the PBX extension telephone number, sending, from the cloud service server to the PBX central unit, a command to connect the PBX extension associated to the PBX extension telephone number to the IVR application, the command including a public extension telephone number leading to the IVR application, receiving, at the cloud service server through the IVR application, an association code from the PBX extension, comparing, at the cloud service server, the association code received through the IVR application with the association code sent to the user account, if the association code received from the PBX extension is the same as the association code sent to the user account, associating, at the cloud service server, the PBX extension to the user account, thereby enabling the control of the PBX extension from the user account through the CTI link.

The invention also provides a method for associating a PBX extension with a user account of a cloud service application for controlling PBX extensions, the cloud service application for controlling PBX extensions being provided by a cloud infrastructure, the cloud infrastructure comprising at least a cloud service server, the PBX extension belonging to a PBX system, the PBX system further comprising a PBX central unit connecting PBX extensions to a Public Switched Telephone Network, the PBX central unit and the cloud service server being connected through a CTI link over an Internet Protocol network, the cloud infrastructure further providing an IVR application available to the PBX extensions over the PSTN network, the method comprising: upon receiving, at the PBX central unit, a command from the cloud service server to monitor a PBX extension, the command including a PBX extension telephone number of the PBX extension to monitor, monitoring, at the PBX central unit, the PBX extension associated to the PBX extension telephone number included in the command, upon receiving, at the PBX central unit, a command from the cloud service server, to connect the PBX extension associated to the PBX extension telephone number with the IVR application, the command including a public extension telephone number leading to the IVR application, connecting the PBX extension associated to the PBX extension telephone number with the public extension telephone number leading to the IVR application, sending, from the PBX extension to the public extension telephone number leading to the IVR application, an association code dialed at the PBX extension by the user.

In embodiments, the method further comprises: locking the PBX extension upon receiving, at the PBX extension from the PBX central unit, a command to lock the PBX extension, unlocking the PBX extension if a valid local PBX extension code is dialed at the PBX extension, the local PBX extension code being different from the association code.

In embodiments, the method further comprises encoding the association code dialed at the PBX extension within a Dual-tone multi-frequency signaling—DTMF—signal.

The invention also provides a PBX system comprising: PBX extensions each comprising a user interface arranged for dialing an association code, a PBX central unit comprising control means arranged for connecting the PBX extensions to a Public Switched Telephone Network, a CTI link for communicating with a cloud service server over an Internet Protocol network, the cloud service server belonging to a cloud infrastructure further providing an IVR application available to the PBX extensions over the PSTN network, control means arranged for upon receiving a command from the cloud service server to monitor a PBX extension, the command including a PBX extension telephone number of the PBX extension to monitor, monitoring the PBX extension associated to the PBX extension telephone number included in the command, upon receiving a command from the cloud service server, to connect the PBX extension associated to the PBX extension telephone number with an IVR application, the command including a public extension telephone number leading to the IVR application, connecting the PBX extension associated to the PBX extension telephone number with the public extension telephone number leading to the IVR application, each PBX extension further comprising control means arranged for sending, to the public extension telephone number leading to the IVR application, an association code dialed at the PBX extension.

The invention also provides a communication system comprising a cloud architecture and PBX system.

BRIEF DESCRIPTION OF THE DRAWINGS

These and other aspects of the invention will be apparent from and elucidated with reference to the embodiments described hereinafter, by way of example, with reference to the drawings.

DETAILED DESCRIPTION OF THE EMBODIMENTS

Figure 1:
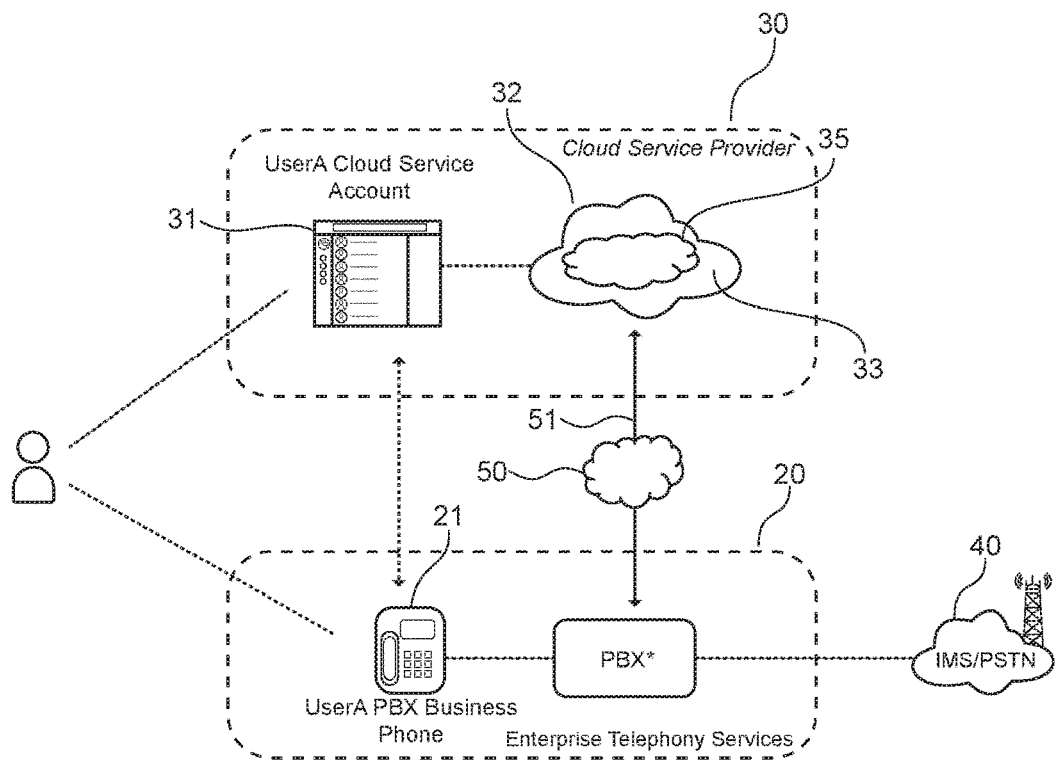
FIG. 1 is a representation of a hybrid system comprising a PBX system and a cloud architecture.
Figure 2:
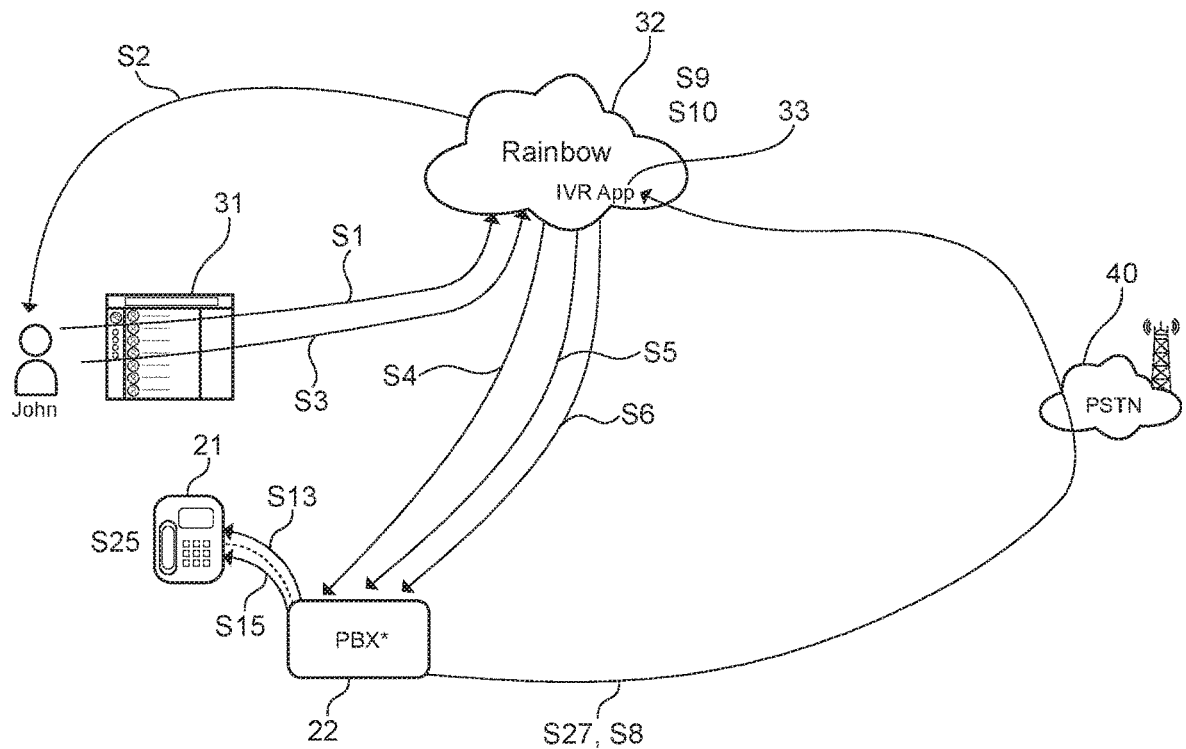
FIG. 2 illustrates a user-device association method according to the invention.
Figure 3:
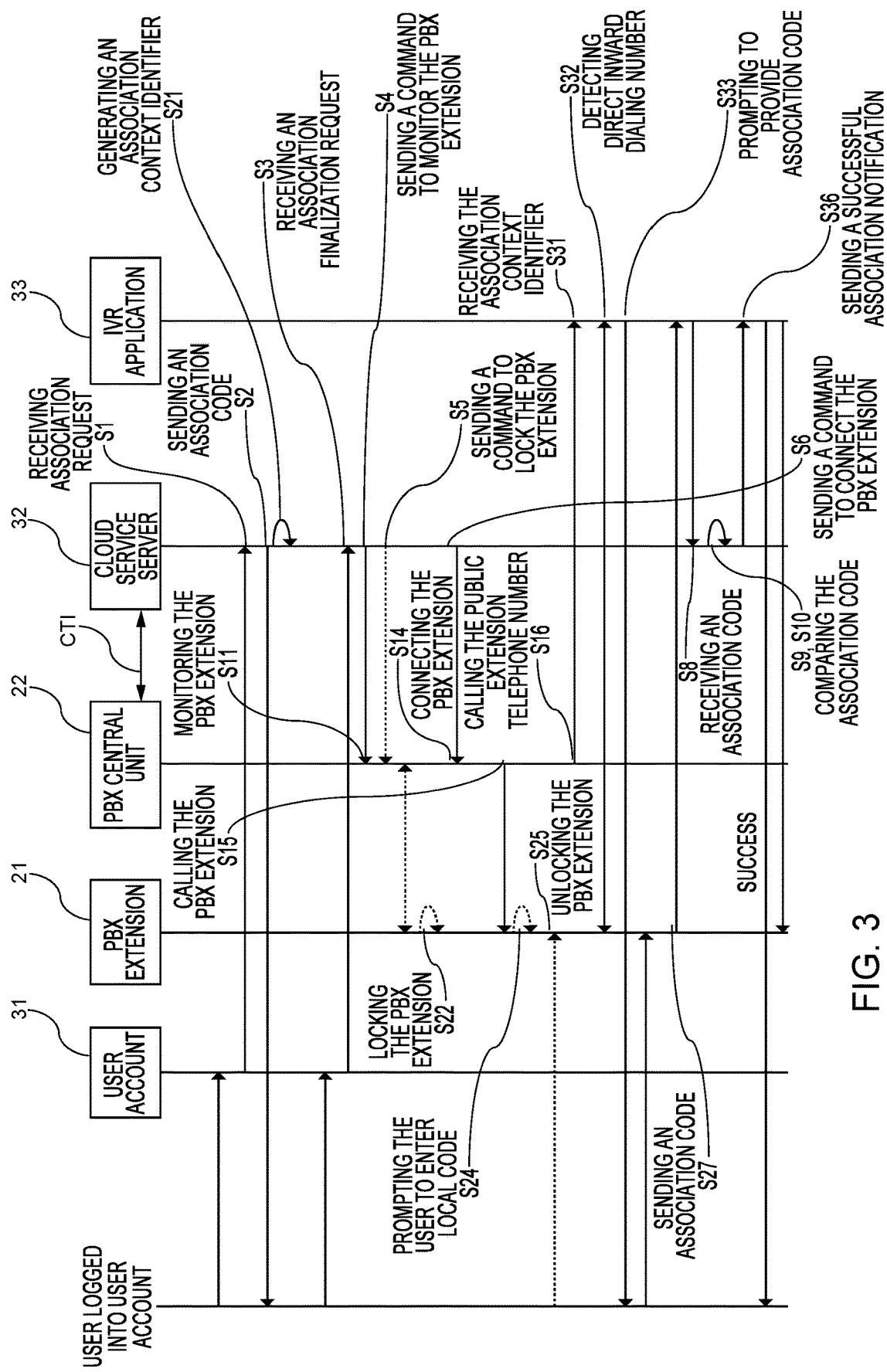
FIG. 3 is a message sequence chart of an embodiment of the method of FIG. 2.

FIG. 1 is a representation of a hybrid system comprising a PBX system 20 and a cloud architecture 30. The PBX system 20 may in particular belong to a company that has subscribed to the cloud service.

The PBX system 20 comprises a plurality of PBX extensions 21 and at least a PBX central unit 22. The PBX central units 22 and PBX extensions 21 can be on the same site or on different sites. In particular, if there is more than one PBX central unit 22, the PBX central units 22 may be on different sites.

A PBX extension 21 can be any type of phone that is supported by the PBX (IP, TDM, Analog, Softphone), as long as it supports CTI monitoring on this phone. A PBX extension 21 includes a user interface arranged for dialing an association code. The user interface can be as simple as a basic dial pad.

The PBX system 20 comprises a PBX central unit 22 arranged for connecting the PBX extensions 21 to a Public Switched Telephone Network 40.

A computer telephony integration (CTI) link 51 allows cooperation between the PBX system 20 and the cloud infrastructure 30 over an Internet Protocol network 50.

The cloud infrastructure 30 provides a cloud service application for controlling PBX extensions belonging to the PBX system 20. The cloud infrastructure 30 includes at least one cloud service server 32. The cloud service server 32 may be composed of independent entities interacting together.

The cloud infrastructure 30 further provides an interactive voice response—IVR—application available to the PBX extensions 21 over the PSTN network 40. IVR allows the PBX extensions 21 to interact with users through the use of voice and DTMF tones input via keypad.

A storage space or container (logical or physical), hereafter called repository 35, is stored in the cloud architecture 30.

Each end-user of the PBX system 20 has a cloud service user account 31 for the cloud service.

The repository 35 registers all the PBX extensions 21 of the PBX system 20, and all the service user accounts 31 associated to the PBX system 20 in a logical space corresponding to the subscribing company.

A PBX extension 21 can only be associated to a cloud service user account 31 if the cloud service user account 31 and PBX extension 21 are registered in the same repository 35.

The PBX extensions 21 or set of PBX extensions 21 of the PBX system 20 are connected to the cloud architecture 30 through a CTI link 51 providing a CTI connectivity between the cloud service and the PBX central unit 22, allowing CTI-driven actions from the cloud applications to the PBX extension, during and after their association to an end-user.

The method for associating a PBX extension 21 with a user account 31 of a cloud service application for controlling PBX extensions comprises the following steps.

Logged into his user account 31 of the cloud service application, using for example a desktop, or a mobile phone, the end user can start a PBX extension association by entering, in the cloud service application, his PBX extension telephone number as it is known at the PBX level (ie this is the internal phone number of the end-user in the corporate PBX system). This step can either be done by the user manually entering a PBX extension telephone number (the cloud service then verifies that the extension telephone number is registered in the repository 35 associated to the PBX system of the user, or by picking up a choice among a restricted list of extension telephone number that the cloud service may build by comparing the name of the user as known at the cloud account level, with information retrieved from the PBX database (typical phone book information retrieved from the PBX and mapping extension to people's names).

Upon receiving, at a step S1, the association request comprising the user account 31 identifier and the PBX extension telephone number entered by the end user, the cloud service server 32 generates, stores in its memory, and sends, at a step S2, an association code to the user of the user account that generated the association request. The association code may for example be a simple Personal identification number (PIN) code made of a 4 digits. The association code may in particular be sent to the cloud service user account 31 through the cloud service application. It may also be sent through an out-of-band method. Using an out-of-band method reduces the risk of someone having stolen the credentials of the cloud service account doing the operation, and also allows the cloud service operator more easily logging and auditing the operation. The out-of-band method can for example be per email or mobile phone, at the condition that the information (email or mobile phone respectively) was created and verified at cloud service account creation and cannot be modified afterwards without cloud provider verification.

At a step S21, the cloud service server 32 may generate an association context identifier. The association context identifier is stored together with the association code generated at step S2.

Once the user receives the association code, he may have to request association finalization from his cloud service application user account 31, by sending at an optional step S3 a finalization request to the cloud service server 32. The next steps require that the user be physically present near the associated phone. The finalization request indicates that the user is near the phone and that the process may continue.

Upon receiving, at step S1, the association request, (or if a request of association finalization is required, upon receiving, at step S3, a request of association finalization), the cloud service server 32 automatically starts monitoring the extension 21 that is being associated, thanks to the CTI link 51 that is established between the cloud service server 32 and the PBX central unit 22. To that end, the cloud service server 32 sends, at a step S4, a command to the PBX central unit 22 to monitor the PBX extension 21 associated to the PBX extension telephone number. Upon receiving the command from the cloud service server 32, at a step S11, the PBX central unit 22 starts monitoring, the PBX extension 21 associated to the PBX extension telephone number included in the command.

The cloud service server 32 may optionally send, at a step S5, a CTI command to the PBX central unit 21 to lock the monitored extension 21 that forces the extension 21 to get locked, resulting in the requirement for a local PBX extension code to be manually entered by the user before any new external call can take place, explicitly confirming that the user owns the extension 21. The way the CTI command actually results in the extension 21 getting locked, at a step S22, depends on the phone and PBX implementation. It can for example consist in a third party call control (SPCC) call made between the extension 21 and a specific prefix that is interpreted by the PBX central unit 22, that then forces the extension 21 to lock itself, or could alternatively be translated by the PBX central unit 22 to directly send a notification to the extension 21, at a step S13, so it locks itself.

Step S5 is optional as it is only applicable to environments that technically support it (phones must support being locked to prevent other people than the device owner to use it, and the feature has to be available thru CTI PBX), and where the practice of using the local code has been deployed, so users know what their device local code is. The cloud service allows the company administrator to activate this security step for user/device associations when all these pre-requisites are met.

If this step is not enforced, the proximity of the user with the phone has to be considered a good-enough indication that the person is the legitimate one (knowing that step S2 allows tracking who received the association code, and pre-requisites ensure only users of the company can associate a phone of this company).

The local code is purely local to the enterprise telephony installation and specific to the phone or phone user (phones may be shared in desk sharing environment, in which case the phone code is rather specific to a user). This code may be chosen by the phone user, and can be compared to a mobile phone PIN code. It is not known to the cloud service, and is totally different from the association code sent in step S2.

The cloud service server 32 sends, at a step S6, a command to the PBX central unit 22 to connect the PBX extension 21 associated to the PBX extension telephone number to the IVR application 33, the command including a public extension telephone number leading to the IVR application 33 managed by the Cloud Service provider. This can be done by triggering a CTI MakeCall on the associated extension.

Upon receiving, at a step S14, the command from the cloud service server 32, the PBX central unit 22 connects the PBX extension 21 associated to the PBX extension telephone number with the public extension telephone number leading to the IVR application 33.

To that end, the PBX central unit 22 calls, at a step S15, the PBX extension 21 associated to the PBX extension telephone number, and, at a step S16, the public extension telephone number leading to the IVR application 33.

The command to connect the PBX extension 21 to the IVR application 33 may further includes the association context identifier set at step S21.

The association context identifier may for example be sent to the IVR application in the form of a set of DTMF digits in the MakeCall in addition to the IVR public extension (for example MakeCall dials 0033390677069*1234567 #).

The association context identifier may alternatively be sent through DTMF over the established connection.

Upon reception, the context identifier digits are automatically dialed, at step S16, by the PBX central unit 22 to the IVR application 33. The context identifier can be used by the IVR application to retrieve the context of the association being confirmed. This method allows the cloud service server 32 unambiguously identifying the incoming call, even if the association code generated at step S2 is not unique. It could be done differently, for example by imposing long association code to end users, ensuring their uniqueness in the timeframe of possibly parallel associations if the cloud service must serve a high rate of users enrolment, or by using a large set of IVR extensions and distributing parallel enrolments over the different public numbers.

If the phone was locked in step S22, before the CTI call can actually be placed by the extension 21, the extension 21 prompts, at a step S24, the user to enter his local code. The user enters the local code and the phone validates and unlocks, at a step S25. If the code entered is invalid, the call fails and the association procedure is stopped. It can possibly be retried by looping on Step S3.

The call from the PBX central unit 21 reaches the IVR application of the Cloud Service at a step S31. The IVR application prompts, at a step S33, the user to provide the association code through DTMF or other method allowing recognizing digits. This is typically done by vocal instructions or by displaying a message on the PBX extension interface.

The user enters the association code through the interface of his PBX extension 21. The PBX extension 21 sends, at a step S27, the association code dialed by the user on the connection established with the IVR. The association code is typically encoded within a DTMF signal.

Upon reception of the call from the PBX extension 21, the IVR application 33 may detect a direct inward dialing number of the calling PBX extension 21. This number will be associated with the user account at a later step S10.

The cloud service server 32 receives, through the IVR application 33, the association code at a step S8.

The received association code, possibly correlated to the association context identifier received at step S31, allows the cloud service server 32 to finalize the association.

The cloud service server 32 compares, at a step S9, the association code received from the PBX extension 21 with the association code sent to the user at step S2.

If an association context identifier was received through the IVR application 33 at step S31, the cloud service server first retrieves from his memory the association code sent to the user at step S2 based on the context identifier.

If the association code entered by the end-user on the phone corresponds to the expected code (as sent in step S2 and retrieved by the cloud service), the association is confirmed, at a step S10, and the cloud service definitely enables CTI services on this extension from the user account. If a direct inward dialing number of the calling PBX extension 21 was detected by the IVR application at step S32, the detected direct inward dialing number of the PBX extension 21 is associated with the user account.

At a step S36, the cloud service server 32 may send a successful association notification to the user account though the IVR application.

Elements such as the cloud service server 32, PBX extensions 21 and PBX central unit 22 could each be e.g. hardware means like e.g. an application-specific integrated circuit (ASIC), or a combination of hardware and software means, e.g. an ASIC and an field-programmable gate array (FPGA), or at least one microprocessor and at least one memory with software modules located therein.

The invention is not limited to the described embodiments. The appended claims are to be construed as embodying all modifications and alternative constructions that may occur to one skilled in the art, and which fairly fall within the basic teaching as set forth herein.

The use of the verb "to comprise", "to include" or "to contain" and their conjugations does not exclude the presence of elements or steps other than those stated in a claim. Furthermore, the use of the article "a" or "an" preceding an element or step does not exclude the presence of a plurality of such elements or steps.

In the claims, any reference signs placed between parentheses shall not be construed as limiting the scope of the claims.

The invention claimed is:

1. A method for associating a PBX extension with a user account of a cloud service application for controlling PBX extensions,
   the cloud service application for controlling PBX extensions being provided by a cloud infrastructure, the cloud infrastructure comprising at least a cloud service server,
   the PBX extension belonging to a PBX system, the PBX system further comprising a PBX central unit connecting PBX extensions to a Public Switched Telephone Network (PSTN),
   the PBX central unit and the cloud service server being connected through a computer telephony integration (CTI) link over an Internet Protocol network,
   the cloud infrastructure further providing an interactive voice response (IVR) application available to the PBX extensions over the PSTN network,
   the method comprising:
      receiving, at the cloud service server, an association request from a user account, the association request comprising a PBX extension telephone number,
      sending, from the cloud service server, an association code to the user account,
      sending, from the cloud service server to the PBX central unit, a command to monitor the PBX extension associated to the PBX extension telephone number,
      sending, from the cloud service server to the PBX central unit, a command to connect the PBX extension associated to the PBX extension telephone number to the IVR application, the command including a public extension telephone number leading to the IVR application,
      receiving, at the cloud service server through the IVR application, an association code from the PBX extension,
      comparing, at the cloud service server, the association code received through the IVR application with the association code sent to the user account,
      if the association code received from the PBX extension is the same as the association code sent to the user account, associating, at the cloud service server, the PBX extension to the user account, thereby enabling the control of the PBX extension from the user account through the CTI link.

2. The method according to claim 1, wherein sending, from the cloud service server to the PBX central unit, a command to monitor the PBX extension associated to the PBX extension telephone number, is performed upon receiving an association finalization request from the user account.

3. The method according to claim 2, further comprising detecting, through the IVR application, a direct inward dialing number of the PBX extension and associating, at the cloud service server, the detected direct inward dialing number of the PBX extension with the user account.

4. The method according to claim 2, further comprising:
   sending, to the PBX central unit over the CTI link, a command to lock the PBX extension associated to the PBX extension telephone number, wherein a local PBX extension code is to be dialed at the PBX extension to unlock it, the local PBX extension code being different from the association code.

5. The method according to claim 2, further comprising generating, at the cloud service server, an association context identifier associated to the association code and storing the association code together with the association context identifier,
   wherein the command to connect the PBX extension associated to the PBX extension telephone number to the IVR application further includes the association context identifier,
   wherein the method further comprises, receiving, at the cloud service server through the IVR application, the association context identifier from the PBX central unit,
   and wherein comparing the association code received from the PBX extension with the association code sent to the user account, includes retrieving the association code sent to the user account based on the association context identifier received through the IVR application.

6. The method according to claim 1, further comprising:
   sending, to the PBX central unit over the CTI link, a command to lock the PBX extension associated to the PBX extension telephone number, wherein a local PBX extension code is to be dialed at the PBX extension to unlock it, the local PBX extension code being different from the association code.

7. The method according to claim 6, further comprising generating, at the cloud service server, an association context identifier associated to the association code and storing the association code together with the association context identifier,
   wherein the command to connect the PBX extension associated to the PBX extension telephone number to the IVR application further includes the association context identifier,
   and wherein the method further comprises, receiving, at the cloud service server through the IVR application, the association context identifier from the PBX central unit,
   and wherein comparing the association code received from the PBX extension with the association code sent to the user account, includes retrieving the association code sent to the user account based on the association context identifier received through the IVR application.

8. The method according to claim 7, further comprising detecting, through the IVR application, a direct inward dialing number of the PBX extension and associating, at the cloud service server, the detected direct inward dialing number of the PBX extension with the user account.

9. The method according to claim 6, further comprising detecting, through the IVR application, a direct inward dialing number of the PBX extension and associating, at the cloud service server, the detected direct inward dialing number of the PBX extension with the user account.

10. The method according to claim 1, further comprising generating, at the cloud service server, an association context identifier associated to the association code and storing the association code together with the association context identifier,
- wherein the command to connect the PBX extension associated to the PBX extension telephone number to the IVR application further includes the association context identifier,
- and wherein the method further comprises, receiving, at the cloud service server through the IVR application, the association context identifier from the PBX central unit,
- and wherein comparing the association code received from the PBX extension with the association code sent to the user account, includes retrieving the association code sent to the user account based on the association context identifier received through the IVR application.

11. The method according to claim 10, further comprising detecting, through the IVR application, a direct inward dialing number of the PBX extension and associating, at the cloud service server, the detected direct inward dialing number of the PBX extension with the user account.

12. The method according to claim 1, further comprising:
- locking the PBX extension upon receiving, at the PBX extension from the PBX central unit, a command to lock the PBX extension,
- unlocking the PBX extension if a valid local PBX extension code is dialed at the PBX extension, the valid local PBX extension code being different from the association code.

13. The method according to claim 12, further comprising encoding the association code dialed at the PBX extension within a Dual-tone multi-frequency signaling (DTMF) signal.

14. The method according to claim 1, further comprising encoding the association code dialed at the PBX extension within a Dual-tone multi-frequency signaling—DTMF— signal.

15. A cloud infrastructure providing a cloud service application for controlling PBX extensions belonging to a PBX system, the PBX system further comprising a PBX central unit connecting PBX extensions to a Public Switched Telephone Network (PSTN), the cloud infrastructure comprising at least a cloud service server,
- the cloud infrastructure providing an IVR application available to PBX extensions over the PSTN network,
- the cloud service server comprising:
  - a CTI link for communicating with the PBX central unit over an Internet Protocol network, control means arranged for
  - receiving, at the cloud service server, an association request from a user account, the association request comprising a PBX extension telephone number,
  - sending, from the cloud service server, an association code to the user account,
  - sending, from the cloud service server to the PBX central unit, a command to monitor the PBX extension associated to the PBX extension telephone number,
  - sending, from the cloud service server to the PBX central unit, a command to connect the PBX extension associated to the PBX extension telephone number to the IVR application, the command including a public extension telephone number leading to the IVR application,
  - receiving, at the cloud service server through the IVR application, an association code from the PBX extension,
  - comparing, at the cloud service server, the association code received through the IVR application with the association code sent to the user account,
  - if the association code received from the PBX extension is the same as the association code sent to the user account, associating, at the cloud service server, the PBX extension to the user account, thereby enabling the control of the PBX extension from the user account through the CTI link.

16. The cloud infrastructure according to claim 15, wherein:
- the PBX extensions each comprise a user interface arranged for dialing an association code, and the PBX central unit comprises control means arranged for:
  - upon receiving a command from the cloud service server to monitor a PBX extension, the command including a PBX extension telephone number of the PBX extension to monitor, monitoring the PBX extension associated to the PBX extension telephone number included in the command,
  - upon receiving a command from the cloud service server, to connect the PBX extension associated to the PBX extension telephone number with an IVR application, the command including a public extension telephone number leading to the IVR application,
  - connecting the PBX extension associated to the PBX extension telephone number with the public extension telephone number leading to the IVR application, each PBX extension further comprising control means arranged for sending, to the public extension telephone number leading to the IVR application, an association code dialed at the PBX extension.

* * * * *